(12) United States Patent
Geier (10) Patent No.: US 12,484,994 B2
(45) Date of Patent: Dec. 2, 2025

(54) MILLING ADAPTOR

(71) Applicant: BIOMET 3I, LLC, Palm Beach Gardens, FL (US)

(72) Inventor: Andreas Geier, Gargazon (IT)

(73) Assignee: BIOMET 3I, LLC, Palm Beach Gardens, FL (US)

( * ) Notice: Subject to any disclaimer, the term of this patent is extended or adjusted under 35 U.S.C. 154(b) by 742 days.

(21) Appl. No.: 17/180,350

(22) Filed: Feb. 19, 2021

(65) Prior Publication Data

US 2021/0259815 A1 Aug. 26, 2021

Related U.S. Application Data

(60) Provisional application No. 62/979,392, filed on Feb. 20, 2020.

(51) Int. Cl.
*B23Q 3/06* (2006.01)
*A61C 13/00* (2006.01)
*B23B 31/11* (2006.01)

(52) U.S. Cl.
CPC ...... *A61C 13/0022* (2013.01); *A61C 13/0006* (2013.01); *B23Q 3/062* (2013.01); *B23B 31/11* (2013.01); *B23C 2226/18* (2013.01); *B23C 2265/32* (2013.01); *Y10T 279/16* (2015.01); *Y10T 409/309016* (2015.01)

(58) Field of Classification Search
CPC ............... B23Q 3/062; A61C 13/0022; A61C 13/0003–13/0021; Y10T 279/16; Y10T 409/30868; Y10T 409/309016; F16B 37/145; B23B 31/11; B23B 2231/04
USPC .............. 269/287, 309, 900; 279/8; 409/219, 409/225; 411/427
See application file for complete search history.

(56) References Cited

U.S. PATENT DOCUMENTS

| | | | | |
|---|---|---|---|---|
| 3,358,727 A | * | 12/1967 | Hughes | B61D 17/043 411/968 |
| 4,615,678 A | * | 10/1986 | Moermann | A61C 5/77 433/201.1 |
| 6,619,895 B1 | * | 9/2003 | Durfee, Jr. | B23Q 16/102 74/813 L |
| 8,505,896 B2 | * | 8/2013 | Kitaura | B23Q 1/0063 269/309 |

(Continued)

FOREIGN PATENT DOCUMENTS

DE 102017112078 A1 12/2018
EP 3395289 A1 * 10/2018

(Continued)

OTHER PUBLICATIONS

Machine Translation of WO 2011/029615 A1, which WO '615 was published Mar. 2011.*

(Continued)

*Primary Examiner* — Erica E Cadugan
(74) *Attorney, Agent, or Firm* — Sheridan Ross P.C.

(57) ABSTRACT

A milling adaptor for affixing an abutment blank for the manufacture of a dental abutment in a housing of a milling unit. The milling adapter includes a holding device extending from a first end to a second end. The holding device includes a flange positioned at the first end and a securing shaft extending from the flange to the second end. The securing shaft includes at least one securing surface for securing the holding device to the housing.

17 Claims, 5 Drawing Sheets

(56) References Cited

U.S. PATENT DOCUMENTS

| | | |
|---|---|---|
| 2009/0075238 A1 | 3/2009 | Galehr |
| 2010/0028834 A1 | 2/2010 | Galehr |
| 2010/0297580 A1* | 11/2010 | Niewiadomski ... A61C 13/0022 433/167 |
| 2012/0214133 A1 | 8/2012 | Jung |
| 2013/0288026 A1* | 10/2013 | Johnson ................ A61C 13/00 428/212 |
| 2017/0056132 A1* | 3/2017 | Kwan ................ A61C 13/0004 |

FOREIGN PATENT DOCUMENTS

| | | | |
|---|---|---|---|
| WO | WO-2011029615 A1 * | 3/2011 | ......... A61C 13/0022 |
| WO | WO-2017211427 A1 | 12/2017 | |

OTHER PUBLICATIONS

Definition of "central", Merriam-Webster's Collegiate Dictionary, 10th ed., p. 186, copyright 1998.*
"European Application Serial No. 21158279.6, Extended European Search Report mailed Jul. 16, 2021", 8 pgs.
Notice of Allowance for European Patent Application No. 21158279. 6, dated Sep. 29, 2023 35 pages.

* cited by examiner

MILLING ADAPTOR

CLAIM OF PRIORITY

This application claims the benefit of U.S. Provisional Patent Application Ser. No. 62/979,392, filed on Feb. 20, 2020, the benefit of priority which is claimed hereby, and incorporated by reference in its entirety.

FIELD

The present invention relates to a milling adaptor and, in particular, to a milling adaptor for holding abutment blanks during milling.

BACKGROUND

A dental implant (referred to herein as "implant") is implanted into an alveolus when a tooth is lost or damaged. Dental implants allow for lost or damaged teeth to be replaced without sacrificing adjacent teeth. An artificial tooth (e.g., crown) attached to the dental functions like a natural tooth. For example, the artificial tooth looks and feels like a natural tooth and allows a patient to speak clearly after an operation, while quickly improving a patient's oral health.

A general overall implant comprises a fixture embedded in the gum, an abutment fixed to the fixture (e.g., by using a screw), and a crown fixed onto the abutment so as to give an external form of an artificial tooth. In this case, the abutment supports the crown. The artificial tooth is modeled individually, so that it replaces the original tooth with as much fidelity to the original as possible and it fits within the existing natural teeth. For optimal seating and optimal shaping of the artificial tooth, the abutment can also be adjusted individually. For example, depending on the existing oral anatomy (anatomy of the mouth), the patient's existing natural teeth, the location and orientation of the implanted dental implant, or to hold the abutment in a certain position, the abutment can be adjusted. Thus, in certain instances, customized abutments (i.e. patient-specific abutments) can be preferred to stock abutments having fixed sizes, shapes, and angulations.

Overview

Medical dentistry is a complex and demanding therapeutic discipline where both functionality and esthetics are required as are expected outcomes. The functionality and esthetics of an implant are related to the precise planning of the dental implant.

An abutment is affixed to the implant in a rotationally fixed position. The implant interface of the abutment provides the connection between the implant and the abutment. The implant interface establishes a form-fitting connection to the implant. In order to affix the abutment to the implant, generally a screw is inserted into the implant through a concentric borehole through the implant interface of the abutment. The abutment is affixed to the implant in this way.

Abutments can be prepared individually and can be manufactured by the dental technician. However, the precision and accuracy to be achieved is lower than what would be possible in industrial manufacturing and using industrial milling machines to prepare abutments (e.g., patient specific abutments) would be beneficial. While industrial milling machines provide dental laboratories with opportunities for improved quality, reproducibility and elimination of human error, depending on the manufacturer and configuration, the cost can be substantial such that only the largest labs and outsource centers can afford these types of milling machines. Additionally, the manufactures of the milling machines generally do not provide their own blanks and purchase them from suppliers. However, if a user is able to purchase or have access to a milling machine, it would be beneficial if the user could use the milling machine with various types of abutment blanks and dental components across different manufacturers having different abutment/implant connections.

In one example, industrial milling machines can have a specific retaining receptacle that is configured to engage with a specific retaining projection of the blank that engages with a portion of the milling machine. Some blanks come prefabricated on the specific retaining projection. However, a need exists for enabling blanks and holder interchangeability, in particular, to abutment blanks.

For example, abutment blanks already provide the implant interface, also known as the implant connection. In some instances, the dental abutment blank can be machined individually by the dental technician. However, the precision and accuracy to be achieved here are lower than what would be possible in industrial manufacturing. The interaction of implant and abutment is extremely important for the enduring stability of the artificial tooth, so the implant interface is prefabricated. The implant interface usually has connecting features, e.g., indexing outer contour, etc., and is usually specific for each implant manufacturer. It allows the abutment to be inserted into the implant in predetermined rotational positions.

It has been found that in machining of the dental abutment blank, vibrations that exert forces on the implant connection (also referred to as the implant interface) occur when the blank is held on the implant connection. In this manner a high stress on the implant connection of the implant blank may occur with intense and extensive machining in the individual case and may even result in damage in the extreme case. It has been recognized that the implant connection of the abutment blank plays a crucial role in a satisfactory functioning of the abutment in the implant and therefore must not be damaged and must not be subjected to any forces in the machining of the abutment blank and in the production of the abutment. However, not coupling the abutment blank to a holder for milling via the implant connection can increase the difficulty of coupling the abutment blank to the holder. For example, additional components such as wrenches, etc., can be needed for attachment.

It is thus an object of the present invention to create a milling adaptor holder for a (dental) abutment blank, that does not couple to the implant connection and allows for easy coupling and decoupling and can be used with industrial milling machines having specific retaining receptacles.

This Overview is intended to provide non-limiting examples of the present subject matter—it is not intended to provide an exclusive or exhaustive explanation. The Detailed Description below is included to provide further information about the present systems.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

DETAILED DESCRIPTION

The present application relates to a blank arrangement, in particular for the production of dental restoration parts, with a blank that is to be machined by being mechanically secured to a milling adaptor for use with industrial milling machines.

While the present invention is described herein mainly with reference to machining dental components, it should be understood that the present invention is not so limited. For example, the principles of the present invention can be applied to medical devices in general (e.g., implants, replacement joint parts, skeletal replacements, etc.) According to its broader examples, the present invention can apply to the milling or shaping of essentially any three-dimensional object.

It is a primary object of an embodiment of the present invention to provide a milling adaptor for holding a mill blank (e.g., an abutment blank) for the manufacture of a dental component (e.g., abutment) during milling. In one example, the milling adaptor can be used in any type milling system, including, but not limited to, 5-axis or 6-axis milling machines. The milling adaptor holder may be fabricated of a metal, resin, ceramic material or a combination thereof. In additional to abutments, examples of three-dimensional objects for manufacturing herein include, but are not limited to, dental articles, such as, a coping, pontic, framework, denture teeth, space maintainer, tooth replacement appliance, orthodontic retainer, denture, post, facet, splint, cylinder, pin, connector, crown, partial crown, veneer, onlay, inlay, bridge, fixed partial denture, and implant.

The term "abutment blank" is used herein to refer to all types of implant abutment structures affixed to the implant and between the implant and a crown or coping. The abutment blank can be a single, monolithic structure, or can be formed by more than one piece and will be milled, machined, or fabricated into a predetermined shape. Abutment blank as used herein refers to abutments blanks that either include or do not include the prefabricated implant interface geometry that mates with the implant.

Figure 1:
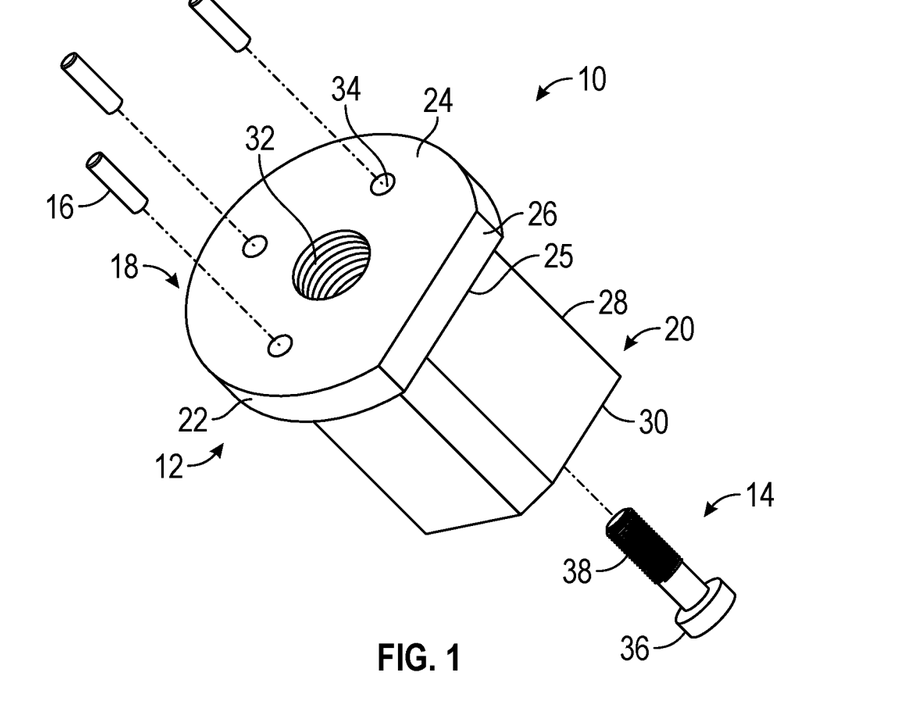
FIG. 1 illustrates an expanded view of the milling adaptor holder system, in accordance with one example of the present disclosure.
Figure 2:
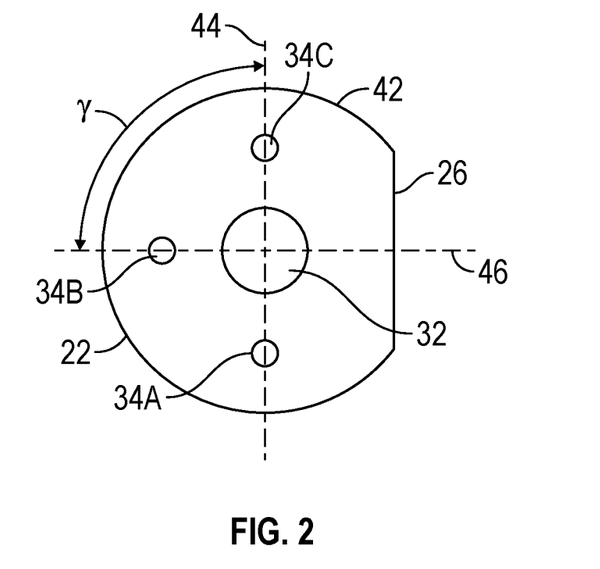
FIG. 2 illustrates a top-down view of a milling adaptor holder in FIG. 1, in accordance with one example of the present disclosure.
Figure 3:
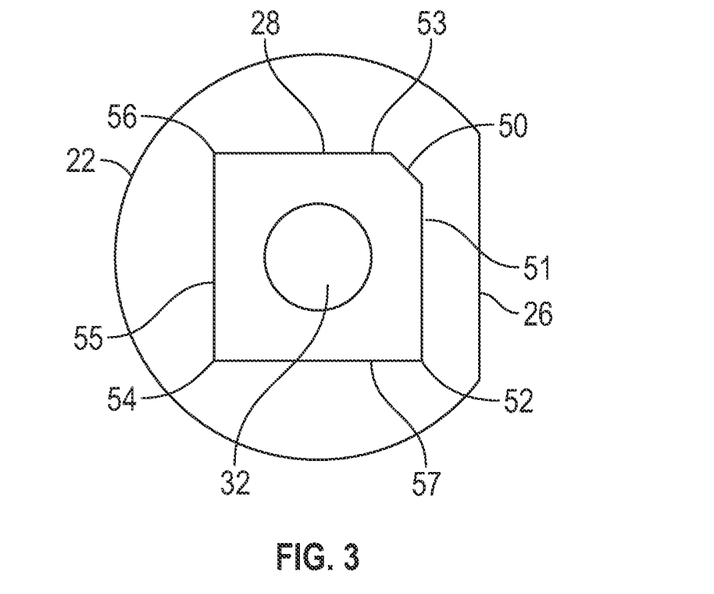
FIG. 3 illustrates a bottom-up view of the milling adaptor holder in FIG. 1, in accordance with one example of the present disclosure.
Figure 4:
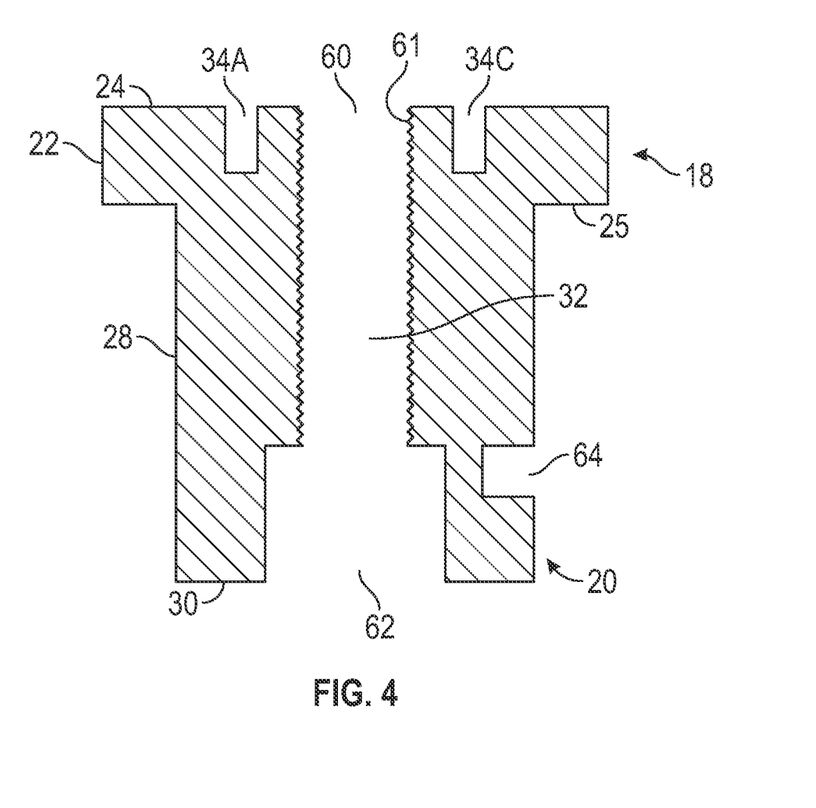
FIG. 4 illustrates a cross-sectional view of the milling adaptor holder in FIG. 1, in accordance with one example of the present disclosure.

FIGS. 1 through 4 illustrate a milling adaptor 10 (referred to herein as "adaptor 10"), in accordance with one example of the present disclosure. FIG. 1 illustrates an expanded view of the adaptor 10 including a holder 12, FIG. 3 illustrates a bottom-up view of the holder 12, and FIG. 4 illustrates a cross-sectional view of the holder 12.

Figure 7:
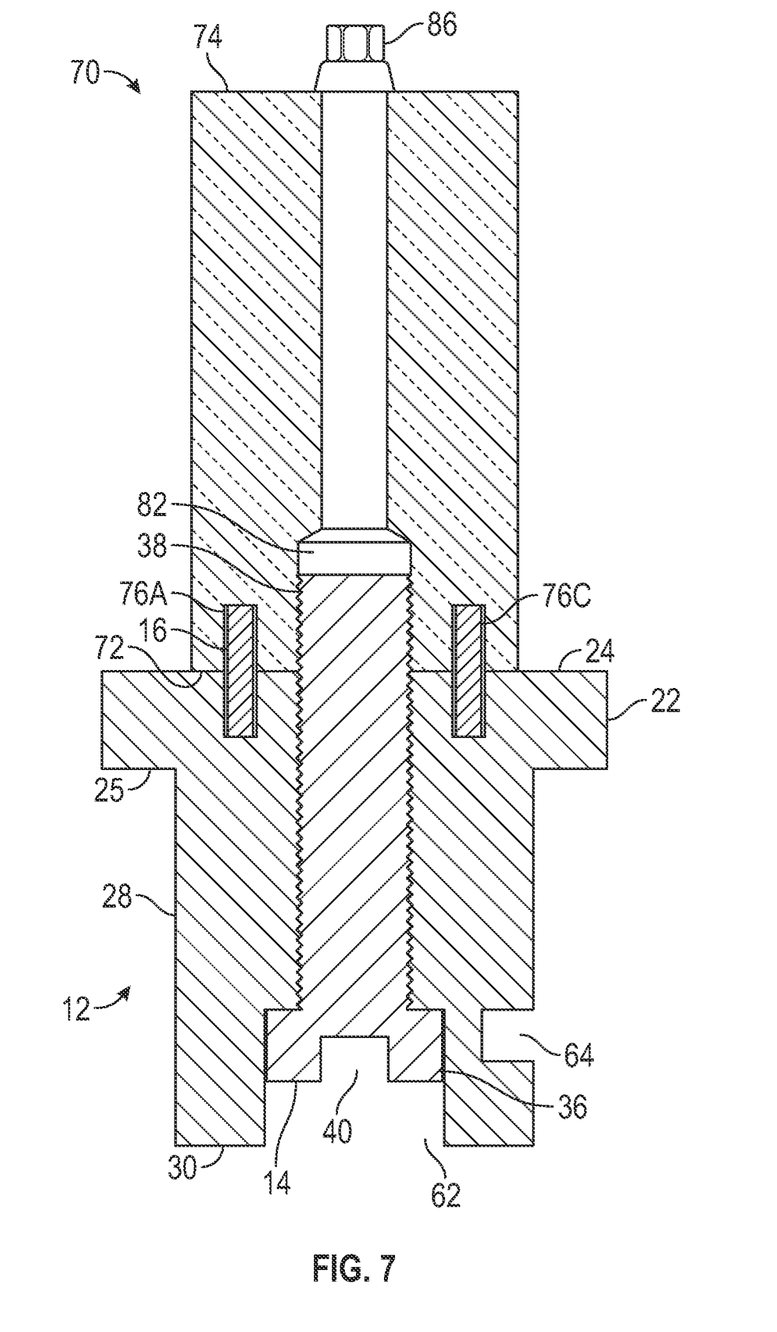
FIG. 7 illustrates a cross-sectional view of an abutment blank coupled to the milling adaptor holder, in accordance with one example of the present disclosure.
Figure 8:
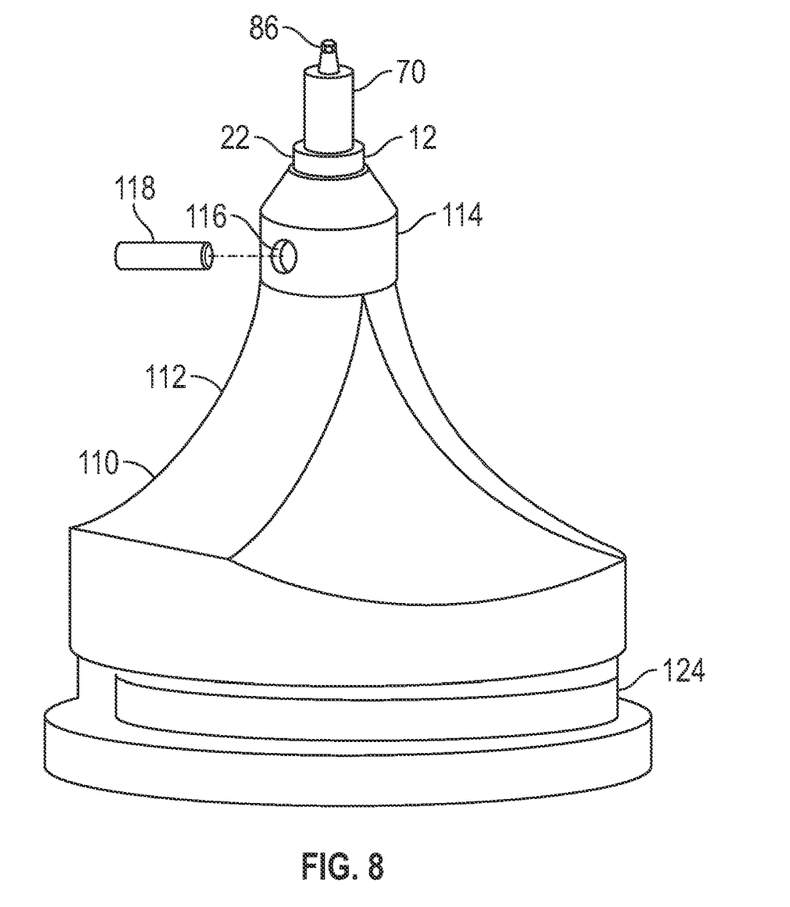
FIG. 8 illustrates a housing assembly of an industrial milling machine including the milling abutment holder and the abutment blank, in accordance with one example of the present disclosure.

The milling adaptor 10 can be used to affix an abutment blank 70 to a housing of a milling unit (see FIG. 8). The holder 12 can be a single, unitary component extending from a first end 18 to a second end 20. The holder 12 can include a flange 22 and a securing shaft 28 extending from the flange 22. The flange 22 can have a width that exceeds the width of an abutment blank 70 (e.g., see FIG. 7) to be coupled to the holder 12. In an example, the flange 22 includes a shoulder 25 and a joining surface 24 opposite the shoulder 25. In one example, shoulder 25 and the joining surface 24 are parallel to each other. In an example, the joining surface 24 is for attaching the abutment blank 70 to the holder 10. As discussed herein, the abutment blank 70 can be joined to holder 10 by mechanically fastening.

The holder 12 can define a joining bore 32 (also referred to herein as "bore 32") and pin holes 34 positioned around the bore 32. The pin holes 34 can be configured to receive pins 16 that can orientate the abutment blank 70 in a precise position, as well as provide anti-rotation properties. A shape of the flange 22 can be circular with one flat surface. For example, a cross-sectional shape of the flange 22, along an axis perpendicular to a longitudinal axis of the holder 12, can have a curved portion 42 and a flat portion 26. As discussed herein, the flat portion 26 can provide a calibration surface for the milling machine.

The holder 12 can include one or more pin holes 34A, 34B, and 34C (referred to herein collectively as "pin holes 34" and individually as "pin hole 34") that can receive corresponding pins 16. The one or more pins 16 can be used such that the orientation of the abutment blank is known, as well as provide anti-rotation support to the abutment blank. That is, the one or more pins 16 can provide additional support such that the abutment does not rotate during milling.

In one example, the pins 16 are separate from the holder 12 and can be inserted into the pin holes 34 positioned adjacent to the bore 32. In one example, the at least one pin 16 can be formed integral with the holder 12.

In one example, the holder 12 can include three pin holes, a first pin hole 34A, a second pin hole 34B, and a third pin hole 34C. As illustrated, the first and third pin holes 34A, 34C are positioned around the bore 34 such that the first and third pin hole 34A, 34C are diametrically opposed from each other about the bore 34. In an example, the second pin hole 34B can be positioned between and equidistant from the first and third pin holes 34A, 34C.

Figure 5A:
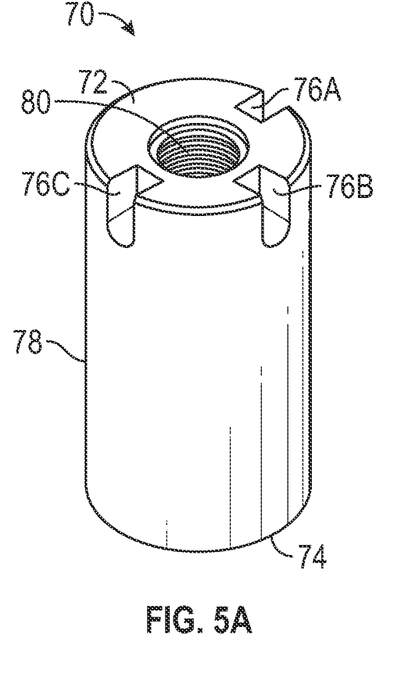
FIG. 5A is a perspective view of an abutment blank, in accordance with one example of the present disclosure.

In an example, a line 44 extending between the center of the first and third pin holes 34A, 34C and a center of the bore 32 forms a right angle γ with a line 46 that extends through the middle of the second pin hole 34B and intersects line 44 through the center. The orientation of the pin holes 34A-C correspond to the positioning grooves 76A-C of the abutment blank 70 (as seen in FIG. 5A) such that there is only one way to couple the abutment blank 70 to the holder 12.

As seen in FIG. 4, the bore 32 extends from the joining surface 24 to a bottom surface 30. The bore 32 can have a first portion 60, optionally including threads 61, and a second portion 62 that is a counterbore. The bore 32 is configured to receive fastener 14 to couple the abutment blank 70 to the holder 12.

As discussed herein, securing shaft 28 engages with a housing of a milling unit (shown in FIG. 8). The securing shaft 28 is what allows the abutment blanks 70 to be coupled to various milling machines. For example, when milling abutments, care needs to be taken to not apply forces to the implant connection. Thus, options are limited for coupling abutment blanks to milling units as the coupling features between the milling unit and the holder are predefined based on the type and manufacturer of the milling system. Since the abutment blank 70 is coupled to the holder 12, the securing shaft 28 can securely couple the abutment blank 70. In on example, the holder 12 can be formed from, but not limited to, metals, ceramics, polymers, composites, or a combination thereof.

In an example, the securing shaft 28 can have a non-rotational shape that matches a corresponding opening in a milling device. Thus, the securing shaft 28 can take on any shape that a particular milling machine may require. In one example, the securing shaft 28 includes a series of longitudinally extending lateral surfaces or sides 51, 53, 55, 57 and at least one securing surface 50. At least one securing surface 50 is included in securing shaft 28 and as many securing surfaces as desired may be included in the securing shaft 28. For example, while only securing surface 50 is shown, any corner 52, 54, and 56 can include a securing surface instead of right as a point between two of the longitudinally extending lateral sides 51, 53, 55, 57.

Securing surface 50 may be located on any point of securing shaft 28 and may extend along the entire length of the securing shaft 28 or only along a portion. Securing surface 50 can be a transition surface between lateral surfaces 51 and 54. In one example, the angle of the securing surface 50 can allow for contact with a bore of the housing or clamping hardware when securing shaft 28 is inserted into a housing. Non-rotational shapes and clamping elements are just a few examples of securing holder 12 to a housing of a milling device. Other methods include, but are not limited to, fitting holder 10 into the housing by interference, such as snap-fit or press-fit.

FIG. 4 is a cross-sectional view of holder 12. In one example, a bottom surface 30, the shoulder 25, and the joining surface 24 are substantially parallel to each other. The orientation of bottom surface 30 may depend on the shape and configuration of the housing into which holder 12 is positioned. As seen in FIG. 4, the bore 32 can receive fastener 14 such that a head 36 of the fastener can be received within the second portion 62 and the shaft 38 can be received within the first portion 60. The head 36 can include a recess 40 having a non-rotational shape configured to mate with a tool to apply a rotational force.

In an example, the holder 12 is shaped in a particular way, in order to allow it to be received in a special work holding fixture of a machining device, which is not represented here. Corresponding work holding fixtures are known and may be designed in any desired suitable way, with numerous different work holding fixtures being in existence, specifically dependent on the milling machine manufacturer.

If the abutment blank 70 is to be machined in a machining device other than the one represented here, the holder 12 can be readily exchanged, and replaced by another holder 12 having the necessary securing shaft geometry, which however has exactly the same joining surface 24, so that the abutment blank 70 can be coupled to the holder 12 in the exact same way regardless of the shape of the securing shaft 28.

Figure 5B:
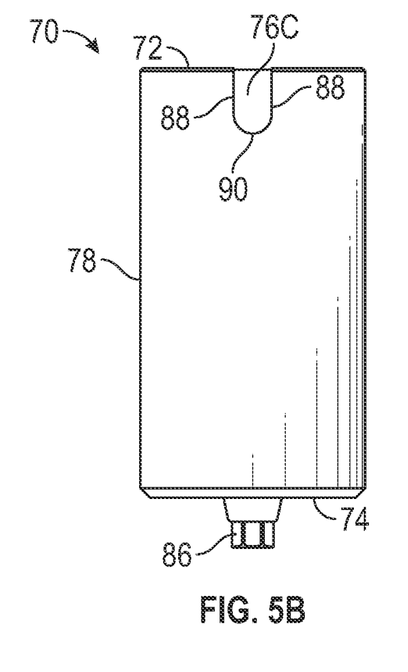
FIG. 5B is a side view of the abutment blank in FIG. 5A, in accordance with one example of the present disclosure.
Figure 5C:
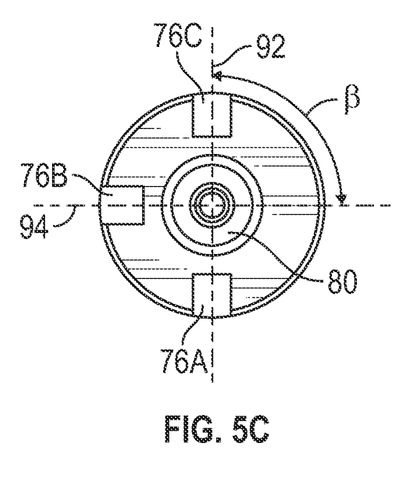
FIG. 5C is a top view of the abutment blank of FIGS. 5A and 5B, in accordance with one example of the present disclosure.
Figure 6:
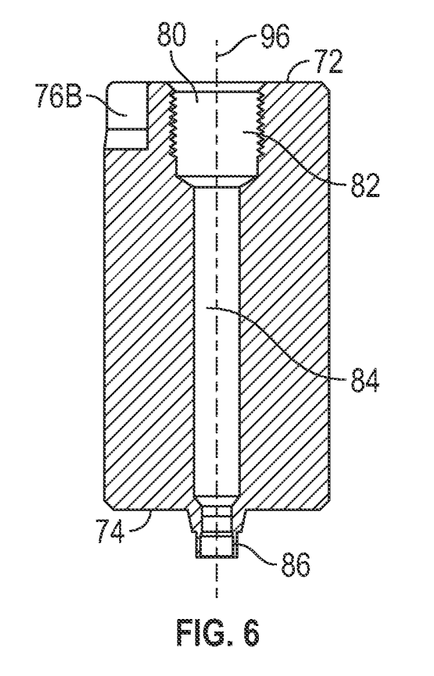
FIG. 6 is a cross-sectional view of the abutment blank, in accordance with one example of the present disclosure.

FIG. 5A is a perspective view of an abutment blank 70, FIG. 5B is a side view of the abutment blank 70 in FIG. 5A, and FIG. 5C is a top view of the abutment blank 70 of FIGS. 5A and 5B. FIG. 6 is a cross-sectional view of the abutment blank 70 along a longitudinal axis 96. In one example, the abutment blanks 70 (milling blanks) can be made of metal. For example, the abutment blanks 100 can be made of, but not limited to, titanium, stainless steel or cobalt chrome. However, other materials are also possible, for example, ceramics, plastics or the like.

The abutment blank 70 includes a body 78 extending from a contact end 72 to the implant engaging end 74. The contact end 72 defines at least one positioning groove 76 and an engagement bore 80. FIGS. 5A-C illustrate the abutment blank 70 including three positioning grooves 76A-C (collectively referred to herein as "positioning grooves 76" or generally "positioning groove 76"). By including at least one or more positioning grooves 76 that engages with pins (e.g., pins 16 in FIG. 1) on the holder 12 provides a system where there is only one position possible for coupling the abutment blank 70 to the holder 12. That is, e.g., with three positioning grooves 76A-C there is only one center point that can be accurately aligned and orientated with respect to the holder 12. For example, while one or two positioning grooves will provide alignment guidance, three positioning grooves can provide the most accurate alignment as well as anti-rotation properties.

The bore 80 includes a threaded portion 82 and is configured to threadably engage with the threads of the shaft 38 of the fastener 14 (as shown in FIG. 1). The abutment blank 70 can also include an unthreaded bore 84 extending from the threaded portion 82 to the implant engaging end 74. As seen in FIGS. 5B and 5C, the abutment blank 70 is coupled with the implant geometry 86. However, the implant geometry 86 can be formed integral with the abutment blank 70 or as a separate component.

The positioning grooves 76 can include two flat surfaces 88 and a curved surface 90 connecting the two flat surfaces 88. Tn an example, the curved surface 90 can also be a flat surface. As seen in FIG. 5C, the positioning grooves 76 are positioned around the bore 80 such that a first and a third positioning groove 76A, 76C are diametrically opposed from each other and a second positioning groove 76B is positioned between and equidistant from the first and second positioning grooves 76A, 76C. In an example, a line 92 extending between the center of the first and third positioning grooves 76A, 76C forms a right angle θ with a line 94 that intersects line 92 and extends through the middle of the third positioning groove 76B.

FIG. 7 illustrates the abutment blank 70 coupled to the holder 12. As illustrates, the abutment blank 70 can be positioned onto the joining surface 24 of the flange 22 by inserting the pins 16 into the positioning grooves 76. Once inserted, the fastener 14 can be threaded into the bore 82 of the abutment blank 70 to couple the abutment blank to the holder 12. The abutment blank 70 and the holder 12 are rotationally and longitudinally locked.

It should be appreciated that abutment blanks of various sizes can accordingly be readily attached centrally on the joining surface 24 of the holder 12. Since the there is only one way to couple the abutment blank 70 to the joining surface 24, and the position of the abutment blank 70 on the joining surface 24 is known, the position of the abutment the flat surface 26 (see FIG. 1) can act as a calibration reference surface for the milling machine. That is, the exact position of the abutment blank 70 to the flat surface 24 is known such that the milling machine will be able to execute milling instructions.

Figure 9:
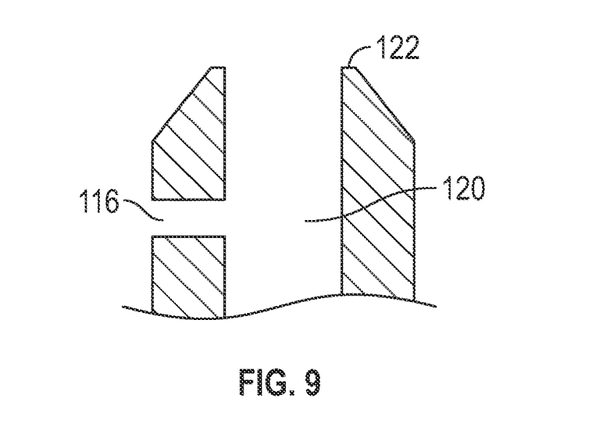
FIG. 9 illustrates a cross-section of a portion of the housing assembly of the industrial milling machine shown in FIG. 8, in accordance with one example of the present disclosure.

Referring to FIGS. 8 and 9, which illustrate a housing assembly 110 of a milling machine. The holder 12 can be inserted into a housing of a milling unit directly, or may be inserted into intermediate parts, which are then inserted into a housing of a milling unit. Typically, holder 12 will be inserted into and secured to a clamping hardware such as clamping chuck 114. Examples of means of securing or fastening to clamping chuck 114 include, but are not limited to, mechanical clamping components such as a bolt, screw, or set screws. Holder 12 may also be secured to chuck 114 by interference or press fit. In one example, securing surface 50 may be further configured to press fit into chuck 114. Configurations include, but are not limited to a notch, an undercut or other surface. In one example, the clamping chuck 114 can include a bore 120 that has a side bore 116 that are in communication. The bore 120 can receive the securing shaft 28 such that the notch 64 (shown in FIG. 4) is aligned with the side bore 116 and can receive a locking pin 118. Additionally, a top surface 122 of the clamping chuck 114 can be configured to engage the shoulder 25 of the flange 22. The Clamping chuck 114 may be inserted into a housing of a milling unit directly or may be attached to an adapter 112, which is then inserted into a housing or pallet 124 of a milling unit.

The securing shaft 28 provides a facile means to secure holder 12 into a housing of a milling unit. While the securing shaft 28 can change and have unlimited configurations that match the particular milling system, the flange 22 and affixing the abutment blank 70 to the holder 12 is the same such that the implant engaging end 74 and the implant geometry 86 are positioned away from the joining surface 24. Thus, the milling adaptor 10 can be adapted to fit into many different types of milling systems.

As the abutment blank 70 is coupled to the adaptor 10 at the contact end 72 opposite the implant engaging end 74 at which the implant geometry 86 is located, forces occur only on the contact end and no forces are transferred to the interface between the implant geometry 86 and the implant engaging end 74 of the abutment blank 70. The contact end 72 itself is not used to produce the abutment. This yields the advantage that the high precision of the implant connection/interface between the implant geometry 86 and the implant engaging end 74 of the abutment blank 70 is retained because no forces are exerted on the implant connection. This ensures satisfactory and long-term functioning of the abutment in the implant. There is no physical stress or burden on the implant interface during the milling operation. Consequently, there cannot be any weakening of the permanent stability, durability or reliability of the abutment in the implant as a result of the production of the abutment from the abutment blank. Additionally, by retaining the fixation elements that couple with the abutment blanks within the holding device system, even when not engaging an abutment blank, the ease of use and efficiency of reloading the holding device system can be increased.

Various Notes & Examples

Example 1 can provide a milling adaptor system for holding an abutment blank in a housing of a milling unit, comprising: a holding device extending from a first end to a second end, the holding device including: a flange positioned at the first end, a securing shaft extending from the flange to the second end, and an engagement bore extending through the holding device; and a fastener having a head and a threaded shaft extending from the head, the fastener configured to extend through the engagement bore and couple with the abutment blank, wherein the securing shaft includes at least one securing surface for securing the holding device to the housing.

Example 2 can include, or can optionally be combined with the subject matter of Example 1, to optionally include where the cross-sectional shape of the securing shaft has a polygon shape with at least two lateral surfaces, wherein at least two of the lateral surfaces are arranged adjacent to each other and extend at right angles to each other.

Example 3 can include, or can optionally be combined with the subject matter of one or any combination of Examples 1 or 2 to optionally include where the cross-sectional shape of the securing shaft includes a transition surface between adjacent lateral surfaces is formed by the at least one securing surface which extends transversely to both adjacent lateral surfaces at an angle of approximately 45 degrees.

Example 4 can include, or can optionally be combined with the subject matter of one or any combination of Examples 1 through 3 to optionally include wherein a cross-sectional shape of the flange includes a curved portion and a flat portion.

Example 5 can include, or can optionally be combined with the subject matter of one or any combination of Examples 1 through 4 to optionally include wherein the flange includes at least one pin hole positioned adjacent to the engagement bore, the at least one pin hole configured to receive a pin to engage with the abutment blank to rotationally affix the abutment blank to the holding device.

Example 6 can include, or can optionally be combined with the subject matter of one or any combination of Examples 1 through 5 to optionally include wherein the at least one pin hole includes a first pin hole, a second pin hole, and a third pin hole, the first, second, and third pin holes are positioned around the engagement bore.

Example 7 can include, or can optionally be combined with the subject matter of one or any combination of Examples 1 through 6 to optionally include wherein the first pin hole and the third pin hole are diametrically opposed from each other.

Example 8 can include, or can optionally be combined with the subject matter of one or any combination of Examples 1 through 7 to optionally include wherein the third pin hole is positioned between and equidistant from the first pin hole and the second pin hole.

Example 9 can include, or can optionally be combined with the subject matter of one or any combination of Examples 1 through 8 to optionally include the abutment blank having a body extending from a contact end to an implant engaging end, the abutment blank including at least one positioning groove and an engagement bore extending from the contact end toward the implant engaging end.

Example 10 can include, or can optionally be combined with the subject matter of one or any combination of Examples 1 through 9 to optionally include wherein the at least one positioning groove includes a first positioning groove, a second positioning groove, and a third positioning groove, the first, second, and third positioning groove are aligned with the first, second, and third pin holes on the flange.

Example 11 can include, or can optionally be combined with the subject matter of one or any combination of Examples 1 through 10 to optionally include three pins configured to be received within a corresponding pin hole and a corresponding positioning groove.

Example 12 can include, or can optionally be combined with the subject matter of one or any combination of Examples 1 through 11 to optionally include wherein the contact end of the abutment blank is configured to engage a top surface of the flange.

Example 13 can provide a method for holding an abutment blank for machining, the method comprising: providing a holding device extending from a first end to a second end, the holding device including: a flange positioned at the first end, the flange including at least one projection extending from a top surface, a securing shaft extending from the flange to the second end, a bore extending through the holding device, and a fastener having a head and a threaded shaft, the threaded shaft configured to extend through the bore to couple with the abutment blank; and affixing the abutment blank to the holding device, the affixing including: positioning the abutment blank on the top surface of the flange such that the at least one projection is received within a corresponding positioning groove along a contact end of the abutment blank and that the bore of the holding device is aligned with an engagement bore of the abutment blank; and applying a rotational force to the head of the fastener such that the threaded shaft extends from the bore and engages with the engagement bore of the abutment blank to affix the abutment blank to the holding device.

Example 14 can include, or can optionally be combined with the subject matter of one or any combination of Examples 1 through 13 to optionally include where the cross-sectional shape of the securing shaft has a polygon shape with at least two lateral surfaces, wherein at least two of the lateral surfaces are arranged adjacent to each other and extend at right angles to each other.

Example 15 can include, or can optionally be combined with the subject matter of one or any combination of Examples 1 through 14 to optionally include where the cross-sectional shape of the securing shaft includes a transition surface between adjacent lateral surfaces is formed by the at least one securing surface which extends transversely to both adjacent lateral surfaces at an angle of approximately 45 degrees.

Example 16 can provide a milling adaptor system for holding an abutment blank in a housing of a milling unit, comprising: a holding device extending from a first end to a second end, the holding device including: a flange positioned at the first end; and a securing shaft extending from the flange to the second end, and wherein the securing shaft includes at least one securing surface for securing the holding device to the housing.

Example 17 can include, or can optionally be combined with the subject matter of one or any combination of Examples 1 through 16 to optionally include where the cross-sectional shape of the securing shaft has a polygon shape with at least two lateral surfaces, wherein at least two of the lateral surfaces are arranged adjacent to each other and extend at right angles to each other.

Example 18 can include, or can optionally be combined with the subject matter of one or any combination of Examples 1 through 17 to optionally include where the cross-sectional shape of the securing shaft includes a transition surface between adjacent lateral surfaces is formed by the at least one securing surface which extends transversely to both adjacent lateral surfaces at an angle of approximately 45 degrees.

Example 19 can include, or can optionally be combined with the subject matter of one or any combination of Examples 1 through 18 to optionally include wherein a cross-sectional shape of the flange includes a curved portion and a flat portion.

Example 20 can include, or can optionally be combined with the subject matter of one or any combination of Examples 1 through 19 to optionally include where the flange includes at least one pin hole positioned adjacent to the engagement bore, the at least one pin hole configured to receive a pin to engage with the abutment blank to rotationally affix the abutment blank to the holding device.

Example 21 can provide a kit including a first holding device having a first flange and a first securing shaft, the first securing shaft having a first cross-sectional shape; and a second holding device having a second flange and a second securing shaft, the second securing shaft having a second cross-sectional shape that is different from the first cross-sectional shape.

Example 22 can include, or can optionally be combined with the subject matter of one or any combination of Examples 1 through 21 to optionally include where the first flange and the second flange are identical.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed:

1. A milling adaptor system configured to position an abutment blank relative to a housing of a milling unit, the milling adaptor system comprising:
   a holding device having opposing first and second ends, the holding device including:
      a flange positioned at the first end and having a joining surface configured to engage the abutment blank, the flange also having an opposing lower surface opposing the joining surface,
      a securing shaft extending from the opposing lower surface of the flange to the second end, and
      an engagement bore extending longitudinally through the holding device with respect to a longitudinal axis of the securing shaft; and
   a fastener having a fastener head and having a threaded shaft extending from the fastener head, the fastener configured to extend through the engagement bore and couple with the abutment blank, such that the flange is positioned between the securing shaft and the abutment blank;
   wherein the securing shaft includes at least one securing surface for securing the holding device to the housing of the milling unit and wherein the flange includes at least one pin hole positioned between the engagement bore and a peripheral edge of the joining surface, the at least one pin hole configured to receive a corresponding pin that engages with the abutment blank to rotationally fix the abutment blank relative to the holding device.

2. The milling adaptor system of claim 1, wherein the engagement bore is parallel to a longitudinal axis of the holding device, wherein a cross-sectional shape of the securing shaft has a polygon shape with at least two lateral surfaces, wherein at least two of the lateral surfaces extend at right angles to each other.

3. The milling adaptor system of claim 1, wherein a cross-sectional shape of the securing shaft includes a transition surface between at least two lateral surfaces, the transition surface being formed by the at least one securing surface, the at least one securing surface extending transversely to the lateral surfaces at an angle of 45 degrees.

4. The milling adaptor system of claim 1, wherein a cross-sectional shape of the flange includes a curved portion and a flat portion.

5. The milling adaptor system of claim 1, wherein a shape of the joining surface of the flange includes a curved portion and a flat portion.

6. The milling adaptor system of claim 5, wherein the at least one pin hole includes a first pin hole, a second pin hole, and a third pin hole, the first, second, and third pin holes are positioned around the engagement bore.

7. The milling adaptor system of claim 6, wherein the first pin hole and the third pin hole are diametrically opposed from each other.

8. The milling adaptor system of claim 6, wherein the second pin hole is positioned between and equidistant from the first pin hole and the third pin hole.

9. The milling adaptor system of claim 6, wherein the abutment blank comprises: a body having a contact end, an implant engaging end, at least one positioning groove, and an engagement bore of the abutment blank, the engagement bore of the abutment blank extending from the contact end of the abutment blank toward the implant engaging end of the abutment blank.

10. The milling adaptor system of claim 9, wherein the at least one positioning groove includes a first positioning groove, a second positioning groove, and a third positioning groove, the first, second, and third positioning grooves are aligned with the first, second, and third pin holes, respectively, the first, second, and third pin holes being located on the flange.

11. The milling adaptor system of claim 10, further including: three pins, wherein each of the three pins is configured to be received within a respective one of the first pin hole, second pin hole, and third pin hole and wherein each pin of the three pins is configured to be received within a respective one of the first positioning groove, second positioning groove, and third positioning groove.

12. The milling adaptor system of claim 9, wherein the contact end of the body of the abutment blank is configured to engage a top surface of the flange.

13. The milling adaptor system of claim 1, wherein the peripheral edge of the joining surface includes a curved portion and a flat portion, and wherein at least a portion of an axis of the engagement bore lies along the longitudinal axis of the securing shaft.

14. The milling adaptor system of claim 13, wherein a cross-sectional shape of the securing shaft has a polygon shape with at least two lateral surfaces, and wherein at least two of the lateral surfaces extend at right angles to each other.

15. The milling adaptor system of claim 13, wherein a cross-sectional shape of the securing shaft includes a transition surface between at least two lateral surfaces, the transition surface being formed by the at least one securing surface, and wherein the at least one securing surface extends transversely to the lateral surfaces at an angle of 45 degrees.

16. The milling adaptor system of claim 13, wherein the engagement bore is parallel to a longitudinal axis of the holding device.

17. The milling adaptor system of claim 16, wherein the at least one pin hole includes a first pin hole, a second pin hole, and a third pin hole, the first, second, and third pin holes are positioned around the engagement bore.

\* \* \* \* \*